United States Patent [19]

Ueno

[11] 4,069,506
[45] Jan. 17, 1978

[54] CASSETTE INSERTION/EJECTION APPARATUS

[75] Inventor: Hideto Ueno, Katsuta, Japan

[73] Assignee: Hitachi, Ltd., Japan

[21] Appl. No.: 691,087

[22] Filed: May 28, 1976

[30] Foreign Application Priority Data

| May 30, 1975 | Japan | 50-72160[U] |
| May 30, 1975 | Japan | 50-72161[U] |
| May 30, 1975 | Japan | 50-72163[U] |

[51] Int. Cl.² .............. G11B 15/10; G11B 15/24; G11B 23/04
[52] U.S. Cl. .................... 360/96; 242/199
[58] Field of Search ........... 360/96, 132, 71, 93, 360/105; 242/198–200

[56] References Cited

U.S. PATENT DOCUMENTS

| 3,609,844 | 10/1971 | Ichikawa | 360/96 |
| 3,684,295 | 8/1972 | Strain et al. | 360/105 |
| 3,747,941 | 7/1973 | Van Der Lely | 360/96 |
| 3,800,323 | 3/1974 | Jenkins | 360/96 |
| 3,820,158 | 6/1974 | Schober | 360/105 |
| 3,867,722 | 2/1975 | Syohji | 360/96 |
| 3,870,247 | 3/1975 | Carisey | 242/198 |
| 3,987,486 | 10/1976 | Ito et al. | 360/96 |

Primary Examiner—Alfred H. Eddleman
Attorney, Agent, or Firm—Craig & Antonelli

[57] ABSTRACT

A cassette tray for carrying a cassette is swingably supported on the sloping plate of the fixed member rigidly attached to the base member. When the cassette tray is swung up from the proper operation position, the cassette is lifted up by the cassette lift-up member so that the cassette slides down. The cassette sliding down along the tray is stopped by engaging the top of the cassette lift-up member with the stepped portion in the bottom face of the cassette.

11 Claims, 7 Drawing Figures

CASSETTE INSERTION/EJECTION APPARATUS

BACKGROUND OF THE INVENTION

1. Field of the Invention

This invention relates to a cassette insertion/ejection apparatus and more particularly to a cassette insertion/ejection apparatus for positioning a cassette at a proper operation position and ejecting the cassette from the proper operation position, the apparatus using the cassette in the form of a housing comprising a top face, a bottom face, a front side face, a rear side face, a left-hand side face and a right-hand side face, in which a pair of hubs are rotatably supported between the top and bottom faces and a roll of tape wound about one of the hubs is extended near the openings capable of receiving magnetic heads in the front side face and wound about the other hub, and in which a pair of cassette locating holes are cut between the top and bottom faces, wherein the apparatus comprising:

a fixed member supporting a pair of turntables and cassette locating pins for rotatably supporting the pair of hubs;

a magnetic head means disposed on the front side of the cassette, the magnetic head means being away from the cassette and opposite to the openings when the cassette is disposed at the proper operational position;

a group of manipulation levers comprising an eject lever and disposed on the rear side;

a cassette tray means having two holes for penetrating the shafts of two turntables and mounted on a base member so as to swing up the magnetic head side thereof by a certain angle about an axis near the group of manipulation levers, at the swung up position the cassette tray being positioned above the top of the shafts of turntables to thereby situate the cassette carried on the cassette tray on the slope higher at the magnetic heads side than the group of manipulation side, at the non-swung up position, i.e. the proper operation position, the shafts of turntables penetrating through the holes and projecting above the cassette tray to be received in the hubs of the cassette, the cassette tray being transferred from the swung up position to the proper operation position in response to the insertion of the cassette and transferred from the proper operation position to the swung up position in response to the actuation of the eject lever;

a stabilizing means for holding the cassette to the fixed member under the situation of receiving the cassette locating pins mounted on the fixed member into the cassette locating holes when the cassette tray is brought into the proper operation position in response to the insertion of the cassette, the stabilizing means releasing the cassette in response to the actuation of the eject lever; and a sliding down means for sliding down the cassette from the cassette tray by floating the cassette from the slope of the cassette tray when the cassette tray is brought into the swung up position in response to the actuation of the eject lever.

2. DESCRIPTION OF THE PRIOR ART

In a conventional cassette tape recorder having a cassette insert/eject apparatus using such a cassette as described above, the sliding plate on which the recording/reproducing head, a erasing head, a pinch roller etc. are mounted, is disposed just rear the manipulation buttons including an eject button and the cassette is set behind the sliding plate, with the front side face of the cassette facing the sliding plate. Therefore, in case of, for example, an upright type cassette deck, the distance between the cassette insert/eject opening and the proper operation position of the cassette is rather long. Accordingly, even after the ejection operation has been finished to lift up the cassette, one must insert his fingers into the cassette insert/eject opening so as to draw out the cassette. In another type of the conventional cassette insert/eject apparatus in which after the cassette has been lifted up it is brought near to the front panel by sliding the cassette down the sloping plane, the ribs attached near the cassette insert/eject opening to stop the cassette sliding down the sloping plane are in the form of stoppers. Accordingly, in this case, the cassette must be manually lifted up by fingers to release the cassette from the ribs when the cassette is taken out. The lifting of the cassette by fingers will cause a nuisance in the manipulation of the tape recorder.

SUMMARY OF THE INVENTION

One object of this invention is to provide a cassette insert/eject apparatus in which the cassette slides down to the cassette insert/eject opening according to ejection operation and in which the cassette can be easily taken out of the opening.

Another object of this invention is to provide a cassette insert/eject apparatus in which the cassette that is sliding down to the cassette insert/eject opening can be stopped exactly at a predetermined position.

An additional object of this invention is to provide a cassette insert/eject apparatus which can attain the preceding objects with a simple structure.

A further object of this invention is to provide a cassette insert/eject apparatus in which the ejection operation causes the cassette to slide down to the cassette insert/eject opening and causes the door for covering the opening to open and in which the cassette can be easily taken out of the opening.

Other object of this invention will be also made clear in the following description of this specification taken in conjunction with the attached drawings.

For these purposes, according to the present invention, when a cassette is inserted in the opening with the front side face forward, the cassette is positioned at the proper operation position where the hubs of the cassette are rotatably supported by the shafts of the turntable; upon the insertion of the cassette, the cassette tray member is pushed by the cassette and the side portion thereof opposite to the manipulation buttons side is swung down by a certain angle about an axis near the manipulation buttons side thereof to thereby positioning the cassette at the proper operation position and holding the cassette and the cassette tray member fixedly at the position. Further, upon the actuation of the eject lever, the cassette tray member is swung up by a certain angle about an axis near the munipulation buttons side thereof and the cassette is lifted up from the cassette tray member to thereby sliding down along the tray member.

DESCRIPTION OF THE PREFERRED EMBODIMENTS

Figure 1:
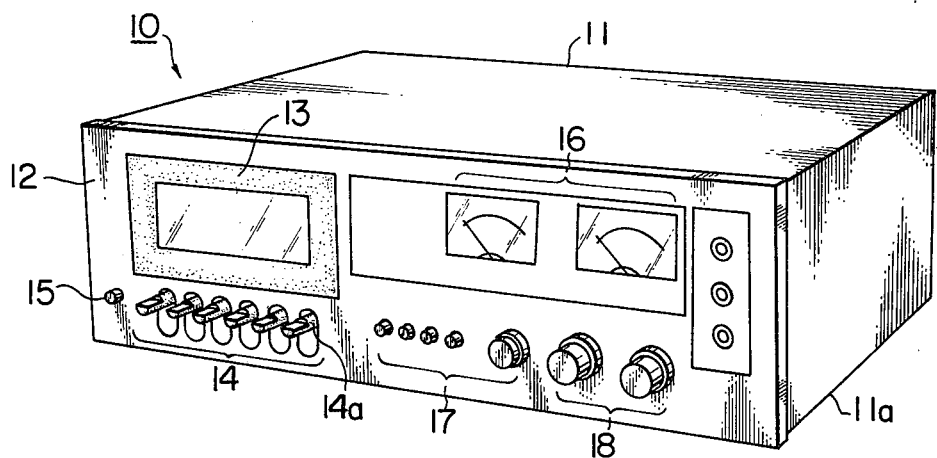
FIG. 1 shows in perspective view of a longitudinal type cassette deck according to this invention.

In FIG. 1, a reference numeral 10 indicates a longitudinal type cassette deck as a whole. The base member of a casing 11, i.e. bottom face 11a, has a front panel 12 attached vertically to its front edge. In the front panel 12, a door 13 is situated left, a group of manipulation levers 14 and a power ON-OFF button 15 below the door 13, U and V meters on the right-hand side of the door 13, and various selection buttons 17 and sound level control buttons 18 on the right-hand side of the manipulation levers 14.

Figure 2:
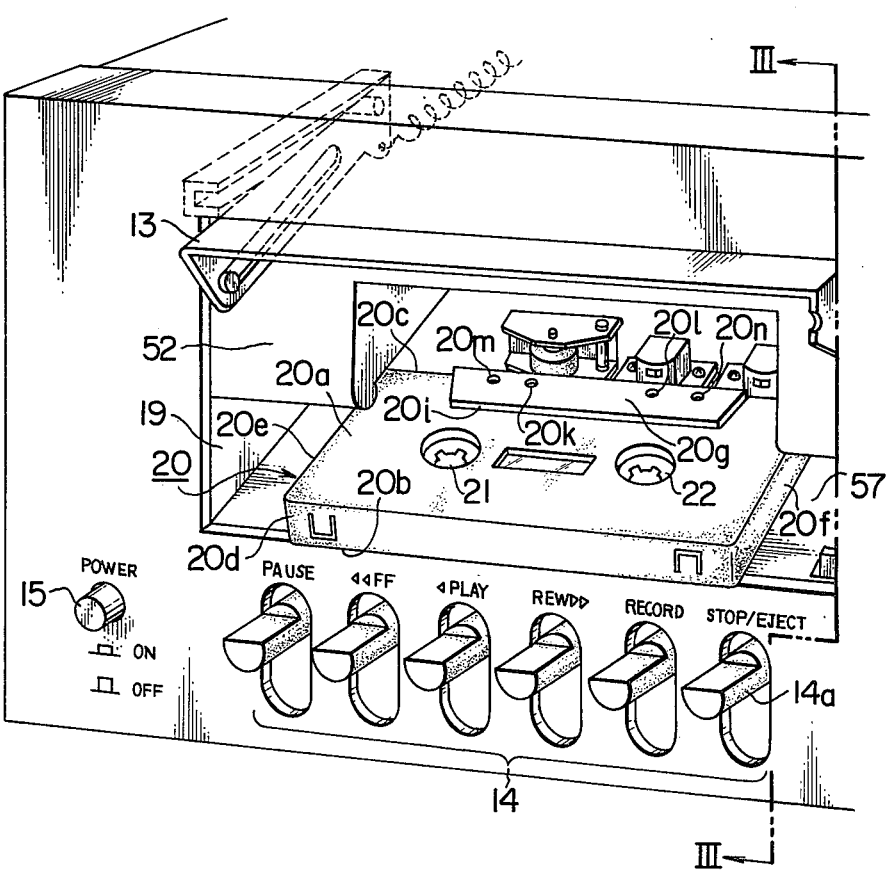
FIG. 2 shows an enlarged scale the cassette insert/eject opening and its peripheral members at the time of ejection operation.

As shown in FIG. 2, the door 13 is open and a cassette 20 is seen through a cassette insert/eject opening 19, the cassette 20 being stopped at the opening after sliding down to the opening. It should here be noted that the cassette 20 is held as shown in FIG. 2 with its front side face 20c confronted toward rear and its rear side face 20d toward the front panel 12. The cassette 20 is a housing comprising a top face 20a, a bottom face 20b, the front side face 20c, the rear side face 20d, a left-hand side face 20e and a right-hand side face 20f, in which a pair of hubs 21 and 22 are rotatably supported between the top and bottom faces 20a and 20b and a roll of tape 70 (see FIG. 5) wound about the hub 21 with its one end fixed to it is extended near and parallel to the openings (not shown) in the front side face 20c and wound about the hub 22 with its other end fixed to the hub 22. The top and bottom faces 20a and 20b have in their central portions near the openings in the front side face 20c a top and a bottom alto-relievo planes 20g and 20h, respectively (see FIG. 3). A sloping plane 20i connects the top alto-relievo plane 20g with the top face 20a and a sloping plane 20j connects the bottom alto-relievo plane 20h with the bottom face 20b. A pair of cassette locating holes 20k and 20l and a pair of capstan receiving holes 20m and 20n are correspondingly cut in each of the alto-relievo planes 20g and 20h. The group of manipulation levers 14 includes a stop/eject lever 14a. When the stop/eject lever 14a is shifted down, the states of the cassette 20 and the door 13 as shown in FIG. 2 will be attained. The stop/eject lever 14a is a well-known one which serve as both a stop and an eject levers, and the shift-down of this lever from its stop position causes the cassette 20 to ejected to the position shown. A stop lever and an eject lever may be separately provided.

Figure 3:
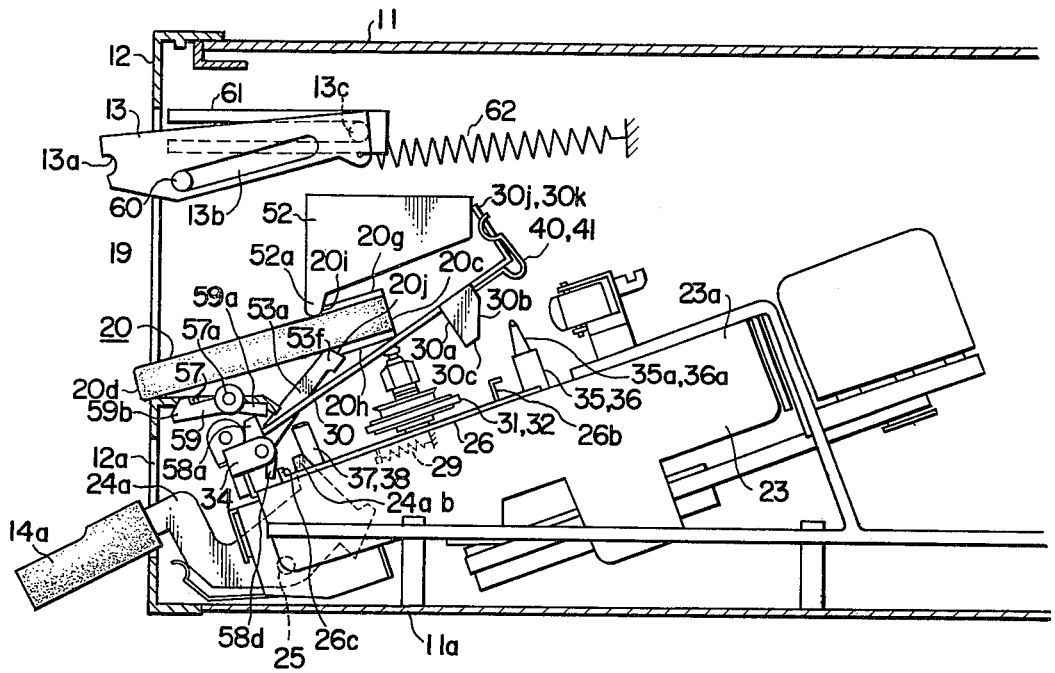
FIG. 3 is a cross section taken along line III — III in FIG. 2, as viewed from right-hand side.
Figure 4:
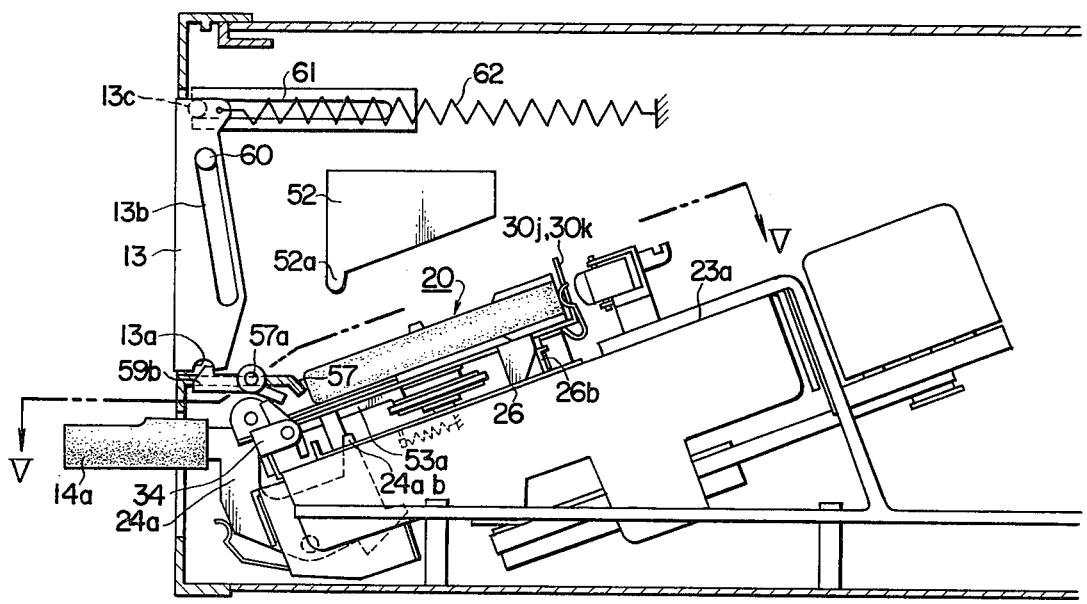
FIG. 4 is a similar cross sectional view, but taken when the cassette is located at its proper operation position.
Figures 5, 6:
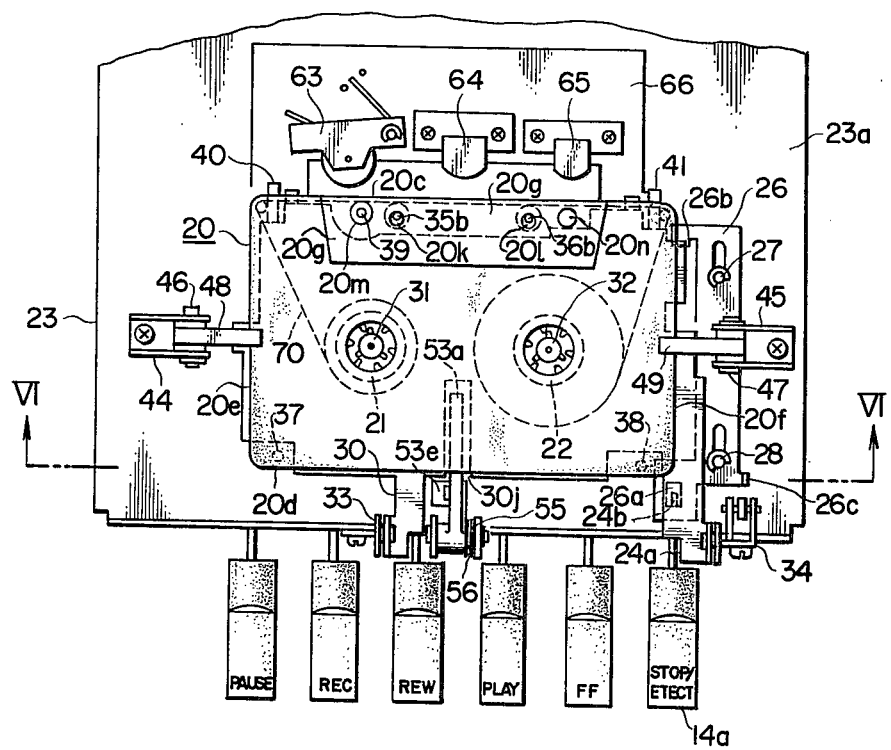
FIG. 5 is a cross section partially omitted, taken along line V — V in FIG. 4 when the cassette is located at its proper operation position, as viewed from top.
FIG. 6 is a cross section taken along line VI — VI in FIG. 5 as viewed from front.

FIG. 3 shows the state of the cassette 20 being ejected while FIGS. 4, 5 and 6 illustrate the cassette 20 set in its proper operation position. The relative positions and the functions of the mechanical parts will be apparent from FIG. 7.

Figure 7:
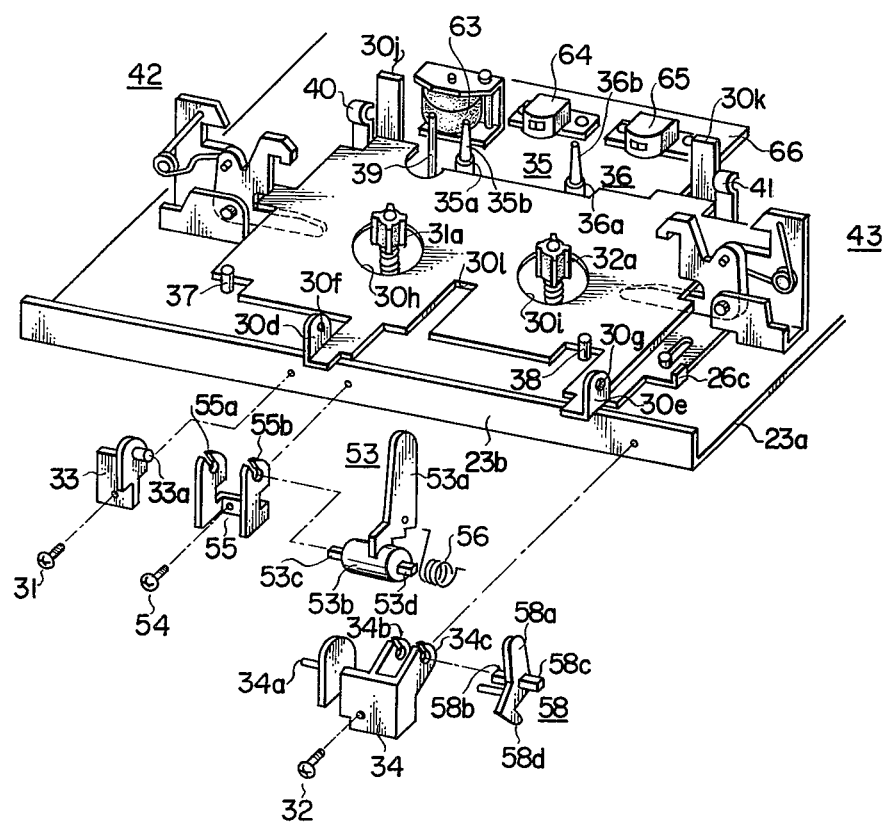
FIG. 7 is a perspective view of the structure shown in FIG. 5, with parts omitted and parts disassembled.

A fixed member 23, e.g. chassis, is fixed onto the base member 11a. The fixed member 23 has a sloping plate 23a inclining up rightward in FIG. 4 and upward in FIG. 5. One end of the sloping plate 23a extends near to the front panel 12. The stop/eject lever 14a protrudes out through an opening 12a in the front panel 12. The end of the lever 14a is coupled to one end of an eject arm 24a. The eject arm 24a is rotatably supported on a shaft 25 and its other end 24ab is inserted in a performation 26a in an eject slider 26 (see FIG. 5). The eject slider 26 can be slided up and down in FIG. 5 and left and right in FIG. 4, guided by pins 27 and 28 fixed upright on the sloping plate 23a. The eject slider 26 is urged rightward by means of a spring 29 as shown in FIG. 4. Accordingly, when the lever 14a is shifted down, the eject slider 26 slides leftwards. The eject slider 26 has upward projections 26b and 26c. The upward projection 26b is opposingly located with respect to the downward lug 30a of a cassette tray 30. The lug 30a has a sloping edge 30b as shown in FIG. 3. The cassette tray 30 also has upward lugs 30d and 30e having perforations 30f and 30g respectively, as shown in FIG. 7. The cassette tray 30 is swingably supported on pins 33a and 34a inserted through the perforations 30f and 30g of the upward lugs 30d and 30e of the cassette tray 30, the pins 33a and 34a being parallel to the sloping plate 23a and fixed to brackets 33 and 34 rigidly attached by means of screws 31 and 32 to the flexed portion 23b of the fixed member 23. A take-up turntable 31 and a supply turntable 32 are rotatably supported on the sloping plate 23a of the fixed member 23, separated from each other at a distance equal to that between the hubs 21 and 22 of the cassette 20. Holes 30h and 30i are cut in the cassette tray 30 so as to penetrate the shaft 31a and 32a respectively through the tray 30, corresponding to the shafts 31a and 32a of the turntables 31 and 32. The lower edge 30c of the downward lug 30a of the cassette tray 30 abuts against the sloping plate of the fixed member 23. The positions of the pins 33a and 34a of the brackets 33 and 34 screwed to the flexed portion 23b of the sloping plate 23 are so determined that when the lower edge 30c of the lug 30a abuts against the sloping plate 23a the cassette tray 30 may be substantially parallel to the sloping plate 23a. When the lower edge 30a of the lug 30a is in contact with the sloping plate 23a, the shafts 31a and 32a of the turnable 31 and 32 are respectively inserted in the hubs 21 and 22 of the cassette 20; cassette locating pins 35 and 36 attached upright on the sloping plate 23a of the fixed member 23 are inserted in the cassette locating holes 20k and 20l, with the bottom face 20b of the cassette 20 abutting against the shouldered portions of the cassette locating pins 35 and 36 (see FIG. 4); the bottoms face 20b of the cassette 20 near the rear side face 20d abuts against the tops of cassette supporting pins 37 and 38; and a capstan 39 is inserted in a capstan hole 20m. A pinch roller 63, a recording head 64 and an erasing head 65 are mounted on a sliding plate 66, opposite to the three openings of the front side face 20c of the cassette 20, and separated from the cassette 20. It should here be noted that plate springs 40 and 41 pressing on the end portions of the front side face 20c where no opening is cut, is attached to the undersurface of the cassette tray 30 to urge the cassette 20 toward the front panel 12 so that the edges of the cassette locating holes 20k and 20l are urged against the small-diameter portions 35b and 36b of the cassette locating pins 35 and 36. Thus, the cassette 20 is in its proper operation position. The cassette tray 30 is also in its proper operation position. The proper operation position is defined as the first stable position. In the first stable position, the cassette tray is urged downward. The downward urging force is applied by two stabilizing means 42 and 43. The two stabilizing means 42 and 43 are symmetrically disposed respectively near the left- and right-hand side faces 20e and 20f of the cassette 20. The stabilizing means 42 and 43 are respectively constituted of brackets 44 and 45 attached to the sloping plate 23a, pins 46 and 47 supported parallel to the sloping plate 23a by the brackets 44 and 45, holding arms swingably supported on the pins 46 and 47, and tortion springs 50 and 51 with their ends engaged with the brackets 44 and 45 and the holding arms 48 and 49. In FIG. 6, the points a and b at which the tortion springs 50 and 51 are engaged with the holding arms 48 and 49 are located inside with respect to the virtual lines; i.e. lines of dead points, connecting the pins 46 and 47 and the points c and at which the tortion springs 50 and 51 are engaged with the brackets 44 and 45 so that the holding arm 48 is urged clockwise while the holding arm 49 is urged counterclockwise. Accordingly, the hooked portions 48a and 49a press the top face 20a of the cassette 20 downward and the angles 48c and 48d urge the cassette tray downward, so that cassette 20 is maintained in the first stable position.

The cassette 20 and the cassette tray 30 are released from their first stable positions by depressing the stop-/eject lever 14a. The depression of the stop/eject lever 14a causes the eject slider 26 to slide downward in FIG. 5 and leftward in FIG. 4. Accordingly, the upward projection 26b urges the sloping edge 30b of the downward projection 30a of the cassette tray 30. The depression of the lever 14a therefore results in the upswing of the side portion of the cassette tray 30 near the magnetic heads 64 and 65 about the pin 33a. As a result, when the points a and b in FIG. 6 are shifted outside the virtual lines C-46 and d-47, i.e. lines of dead points, the tortion springs 50 and 51 urge the holding arms 48 and 49 in the opposite direction. The cassette tray 30 is then lifted up by the projections 48e and 48f of the holding arms 48 and 49 lying under the cassette tray 30 and positioned upward the top portions of the shafts 31a and 32a. The upward flexed portions 30j and 30k of the cassette tray 30 abut against guide frames 52 fixed to the casing 11 at it side walls and the tray 30 is kept in the position shown in FIG. 3. This position of the cassette tray 30 is defined as the quasi-operation position, i.e. second stable position. The holding arms 48 and 49 are also kept in the positions assumed. The upswing of the cassette tray 30 carries the cassette in the same direction and when the pins 35b and 36b are withdrawn from the cassette locating holes 20k and 20l, the cassette 20 slides down along the cassette tray 30 to the cassette insert/eject opening 19. The sliding of the cassette 20 is then accelerated by the urging force of the plate springs 40 and 41 against the front side face 20c of the cassette 20.

It should here be noted that when the cassette tray 30 is stably kept in the second stable position, i.e. quasi-operation position, a cassette lift-up member 53 extends above the cassette tray 30 through an opening 30j cut therein (see FIGS. 5 and 7). The cassette lift-up member 53 consists of a cassette lift-up arm 53a, a cylindrical portion 53b and shaft portions 52c and 53d, the arm 53a and the portions 53b, 53c and 53d being integrally formed. The cassette lift-up member 53 is swingably supported on a pair of opposing arms 55a and 55b of a bracket 55 rigidly attached to the flexed portion 23b of the sloping plate 23a by a screw 54. A tortion spring 56 is fitted about the cylindrical portion 53b and one end of the spring 56 is engaged with the cassette lift-up arm 53a while the other end of the spring 56 is engaged with the flexed portion 23b of the sloping plate 23a. The state of assembling the bracket 55, the cassette lift-up member 53 and the tortion spring 56 will be apparent from FIG. 7. Accordingly, the cassette lift-up member 53 is urged in the counterclockwise direction by the tortion spring 56. The projection 53e of the member 53 shown in FIG. 5 abuts against the cassette tray 30 so that the cassette lift-up arm 53a extends above the cassette tray 30 as shown in FIG. 3. The tip 53f of the arm 53a urges against the bottom face 20 of the cassette 20 sliding down and the cassette slides down under the guide of the tip 53f of the cassette lift-up arm 53a. A cover frame 57 is provided near the cassette insert/eject opening 19 over the brackets 33, 34 and 55, the cover frame 57 being rigidly attached to the front panel 12. The cassette slides from the tip 53f of the arm 53a toward the cover frame 57. The cassette 20 is stopped, assuming the position shown in FIG 3, with its bottom sloping plane 20j abutting against the tip 53f of the arm 53a. At the same time, the top face 20a of the cassette 20 contacts with the downward projection 52a of the guide frame 52. Then, the reat side face 20d of the cassette 20 lies outside the cassette insert/eject opening 19. If the cassette 20 is pulled out by picking up the portion of the cassette 20 outside the opening 19 with fingers, the cassette lift-up arm 53a of the cassette lift-up member 53 is forced to rotate clockwise against the urging force of the tortion spring 56 (see FIGS. 5 and 7) so that the cassette 20 can be easily taken out. In this case, the cassette lift-up member may be fixed while the guide frame is made elastic.

The manipulation for ejection of the insert/eject lever 14a also causes the door 13 to automatically open. This operation will be clear from the following description. As shown in FIG. 7, the bracket 34 also has opposing arms 34b and 34c and the shafts 58b and 58c of a swing arm 58 are rotatably supported on the opposing arms 34b and 34c. The lower tip 58d of the swing arm 58 is disposed opposite to the upward projection 26c of the eject slider 26 while the upper tip 58a of the arm 58 abuts against one end 59a of a door lock arm 59 which is rotatably supported on a pin 57a projecting from the side surface of the cover frame 57 and which is urged clockwise (see FIG. 4). As seen in FIG. 4, the other end 59b of this arm 59 extends above the cover frame 57 through a perforation cut therein and is received in the engaging recess 13a of the door 13. Guide slots 13b are cut in both the side faces of the door 13. The pins 60 which are projecting from the side surfaces of the casing 11, are located in the guide slots 13b and when the pins 60 are situated at the top ends of the guide slots 13b, the door 13 covers the cassette insert/eject opening 19. Also, at the top ends of the side faces of the door 13 project out pins 13c which are inserted in guide slot frames 61 rigidly attached, parallel to the top wall of the casing 11, onto the side walls of the front panel 12. The door 13 is urged in the direction of opening by means of coil springs 62 anchored to the top ends of the side faces of the door 13. When the stop/eject lever 14a is shifted down for eject operation, the eject slider 26 slides leftward as seen in FIG. 4 so that the upward projection 26c pushes the lower tip 58a of the swing arm 58 to rotate the arm 58 clockwise. Accordingly, the upper tip 58a of the arm 58 pushes the end 59a of the door lock arm 59 to rotate the arm clockwise. The other end 59 b of the arm 59 is then disengaged from the engaging recess 13a of the door 13. The door 13 is now released from the locking condition and pulled in to open the cassette insert/eject opening 19, as shown in FIG. 3, by the urging forces of the springs 62, with the aid of the guiding mechanism consisting of the pins 13c and 60 and the guide slots 13b and the guide slot frames 61. At the same time, the cassette tray 30 siwngs up and the cassette 20 slides down until it is stopped by the cassette lift-up member 53.

The setting of the cassette 20 into its proper operation position is performed as follows. As shown in FIGS. 2 and 3, the cassette 20 is inserted through the cassette insert/eject opening 19, with the rear side face 20d directed toward the front panel 12. The front side face 20c of the cassette 20 then abuts against the cassette lift-up member 53 and the guide frame 52. When the cassette 20 is pushed in, the member 53 is pushed down by the cassette 20. If the cassette 20 is further pushed in, the front side face 20c of the cassette 20 pushed down the cassette tray 30 so that the points a and b shift to the inside of the virtual lines c - 46 and d-47 as shown in FIG. 6. Accordingly, the holding arms 48 and 49 pushes down the cassette 20 and the cassette tray 30 by means of the urging forces of the tortion springs 50 and 51 so that the cassette 20 is brough into the proper operation position.

As described above, according to this invention, the manipulation for ejection causes the cassette tray to swing up, and the cassette slides down toward the cassette insert/eject opening to thereby making it easy to take out the cassette. Further, the cassette lift-up member gauged with the cassette tray is rotated a little farther than the cassette tray to lift up the cassette; and the cassette sliding down is stopped by the cassette lift-up member. Therefore, it is easy to take out the cassette since the cassette has only to be drawn out from the second stable position in which the cassette is stopped by the cassette lift-up members. Moreover, the cassette can be easily drawn out by picking up the portion thereof near the rear side face since the portion is outside the cassette insert/eject opening when the cassette is in the second stable position. Further, since the plate springs for locating the cassette in the proper operation position are attached to the rear end of the cassette tray, the springs push the cassette toward the cassette insert/eject opening in the ejection operation so that the cassette can slide smoothly down the cassette tray to the second stable position. Thus, there is no need for any additional means for pushing the cassette toward the insert/eject openings in the ejection operation. Therefore, the cassette ejection operation is improved in simplicity so that the resultant reduction in cost can be expected. Moreover, a single manipulation can cause the door to open and the cassette to be ejected so that the operability of the cassette is remarkably improved.

I claim:

1. A cassette insertion/ejection apparatus for positioning a cassette at a proper operation position and ejecting the cassette from the proper operation position, said apparatus using the cassette in the form of a housing comprising a top face, a bottom face, a front side face, a rear side face, a left-hand side face and a right-hand side face, in which a pair of hubs are rotatably supported between said top and bottom faces and a roll of tape wound about one of said hubs is extended near the openings capable of receiving magnetic heads in said front side face and wound about the other hub, and in which a pair of cassette locating holes are cut between said top and bottom faces, wherein said apparatus comprising:

a fixed member supporting a pair of turntables and cassette locating pins for rotatably supporting said pair of hubs;

a magnetic head means disposed on said front side of the cassette, said magnetic head means being away from the cassette and opposite to said openings when the cassette is disposed at said proper operational position;

a group of manipulating levers comprising an eject lever and disposed on said rear side;

a cassette tray means having two holes for penetrating the shafts of two turntables and mounted on a base member so as to swing up the magnetic head side thereof by a certain angle about an axis near said group of manipulation levers, at the swung up position said cassette tray being positioned above the top of said shafts of turntables to thereby situate said cassette carried on said cassette tray on the slope higher at the magnetic heads side than the group of munipulation side, at the non-swung up position, i.e. the proper operation position, said shafts of turntables penetrating through said holes and projecting above said cassette tray to be received in said hubs of said cassette, said cassette tray being transferred from said swung up position to said proper operation position in response to the insertion of said cassette and transferred from said proper operation position to said swung up position in response to the actuation of said eject lever;

a stabilizing means for holding said cassette to said fixed member under the situation of receiving said cassette locating pins mounted on said fixed member into said cassette locating holes when said cassette tray is brought into said proper operation position in response to the insertion of said cassette, said stabilizing means releasing said cassette in response to the actuation of said eject lever; and a sliding down means for sliding down said cassette from said cassette tray by floating said cassette flow the slope of said cassette tray when said cassette tray is brought into said swung up position in response to the actuation of said eject lever.

2. A cassette insertion/ejection apparatus as claimed in claim 1, said sliding down means having an end portion located on the magnetic head side, said end portion being constructed so as to engage with a bottom sloping plane of said cassette provided near said front side face of said bottom face to thereby prevent said cassette from sliding down completely.

3. A cassette insertion/ejection apparatus using a cassette in the form of a housing comprising a top face, a bottom face, a front side face, a rear side face, a left-hand side face and a right-hand side face, in which a pair of hubs are rotatably supported between said top and bottom faces and a roll of tape wound about one of said hubs with its one end fixed to said one hub is extended near and parallel to the openings in said front side face and wound about the other hub with its other end fixed to said other hub; in which said top and bottom faces have in their central portions near said openings in said front side face a top and a bottom alto-relievo planes, a sloping plane connecting said top alto-relievo plane with said top face and another sloping plane connecting said bottom alto-relievo plane with said bottom face; and in which a pair of cassette locating holes and a pair of capstan receiving holes are cut correspondingly in each of said top and bottom alto-relievo planes, said apparatus serving to set said cassette to the proper operation position and to eject the same from said position and comprising;

1. a base member;
2. a fixed member fixed to said base member and having a sloping plate rising from front to rear side;
3. a supply and a take-up turntables rotatably supported on said sloping plate and separated from each other by a distance equal to that between said hubs of said cassette;
4. a group of manipulation levers including an eject lever, disposed in front of said base member;
5. a cassette tray for carrying said cassette thereon with said rear side face facing said group of said manipulation levers, said cassette tray being swingable between the proper operation position in which said turntables are received in said hubs of said cassette and the quasioperation position which is separated from said proper operation position by a certain angle about an axis near said group of said manipulation levers;
6. a pair of stabilizing means for stably locating said cassette tray in said proper operation position and said quasi-operation position, said stabilizing means bringing said cassette tray in said quasi-operation position into said proper operation position by rotating said tray by the urging force with which said cassette is pressed against said cassette tray and also bringing said cassette tray in said proper operation position into said quasi-operation position in accordance with the actuation of said eject lever; and
7. a cassette lift-up member having a cassette lift-up arm which abuts against said bottom face of said cassette when said cassette tray is kept in said proper operation position by said stabilizing means and can be rotated up from said position about a certain axis near said manipulation levers, which rotates said cassette lift-up arm a little farther than said cassette tray to lift-up said cassette when said cassette tray rotates from said proper operation position to said quasi-operation position, so that said cassette may slide down guided by said arm, and which then stops said cassette sliding down by engaging said arm with said bottom sloping plane of said cassette.

4. A cassette insertion/ejection apparatus as claimed in claim 3, wherein said cassette lift-up arm is pulled forward, said cassette lift-up arm is rotated toward said cassette tray so that said cassette may be drawn out.

5. A cassette insertion/ejection apparatus as claimed in claim 3, further comprising urging members attached to the rear end of said cassette tray, which press the edges of said cassette locating holes of said cassette in said proper operation position against said cassette locating pins inserted in said cassette locating holes toward said manipulation levers so that said cassette may be securely located in its proper operation position, and which press said cassette in its quasi-operation position, with said locating holes separated from said locating pins, toward said manipulation levers so that the pressing force of said urging members may also serve to eject said cassette.

6. A cassette insertion/ejection apparatus using a cassette in the form of a housing comprising a top face, a bottom face, a front side face, a rear side face, a left-hand side face and a right-hand side face, in which a pair of hubs are rotatably supported between said top and bottom faces and a roll of tape wound about one of said hubs with its one end fixed to said one hub is extended near and parallel to the openings in said front side face and wound about the other hub with its other end fixed to said other hub; in which said top and bottom faces have in their central portions near said openings in said front side face a top and a bottom alto-relievo planes, a sloping plane connecting said top alto-relievo plane with said top face and another sloping plane connecting said bottom alto-relievo plane with said bottom face; and in which a pair of cassette locating holes and a pair of capstan receiving holes are cut correspondingly in each of said top and bottom alto-relievo plane, said apparatus serving to set said cassette to the proper operation position and to eject the same from said position and comprising:

1. a base member;
2. a front panel attached to said base member and having a cassette insert/eject opening and a plurality of perforations below said opening;
3. a fixed member fixed to said base member and having a sloping plate rising from front to rear side;
4. a supply and a take-up turntables rotatably supported on said sloping plate and separated from each other by a distance equal to that between said hubs of said cassette;
5. a group of manipulation levers including an eject lever, disposed in front of said base member and extended outside said front panel through said perforations of said panel;
6. a cassette tray for carrying said cassette thereon with said rear face facing said group of said manipulation levers, said cassette tray being swingable between the proper operation position in which said turntables are received in said hubs of said cassette and the quasioperation position which is separated from said proper operation position by a certain angle about an axis near said group of said manipulation levers;
7. a pair of stabilizing means for stably locating said cassette tray in said proper operation position and said quasi-operation position, said stabilizing means bringing said cassette tray in said quasi-operation position into said proper operation position by rotating said tray by the urging force with which said cassette is pressed against said cassette tray and also bringing said cassette tray in said proper operation position into said quasi-operation position in accordance with the actuation of said eject lever; and
8. a cassette lift-up member having a cassette lift-up arm which abuts against said bottom face of said cassette when said cassette tray is kept in said proper operation position by said stabilizing means and can be rotated up from said position about a certain axis near said manipulation levers, which rotates said cassette lift-up arm a little further than said cassette tray to lift-up said cassette when said cassette tray rotates from said proper operation position to said quasi-operation position, so that said cassette may slide down guided by said arm, and which stops said cassette by engaging said arm with said bottom sloping plane of said cassette, when said rear side face of said cassette comes outside said front panel through said cassette insert/eject opening.

7. A cassette insertion/ejection apparatus as claimed in claim 6, wherein said cassette lift-up arm is pulled forward, said cassette lift-up arm is rotated toward said cassette tray so that said cassette may be drawn out.

8. A cassette insertion/ejection apparatus as claimed in claim 6, further comprising urging members attached to the rear end of said cassette tray, which press the edges of said cassette locating holes of said cassette in said proper operation position against said cassette locating pins inserted in said cassette locating holes toward said manipulation levers so that said cassette may be securely located in its proper operation position, and which press said cassette in its quasi-operation position, with said locating holes separated from said locating pins, toward said manupulation levers so that the pressing force of said urging members may also serve to eject said cassette.

9. A cassette insertion/ejection apparatus using a cassette in the form of a housing comprising a top face, a bottom face, a front side face, a rear side face, a left-hand side face and a right-hand side face, in which a pair of hubs are rotatably supported between said top and bottom faces and a roll of tape wound about one of said hubs with it one end fixed to said one hub is extended near and parallel to the openings in said front side face and wound about the other hub with its other end fixed to said other hub; in which said top and bottom faces have in their central portions near said openings in said front side face a top and a bottom alto-relievo planes, a sloping plane connecting said top alto-relievo plane with said top face and another sloping plane connecting said bottom alto-relieve plane with said bottom face; and in which a pair of cassette locating holes and a pair of capstan receiving holes are cut correspondingly in each of said top and bottom alto-relievo plane, said apparatus serving to set said cassette to the proper operation position and to eject the same from said position and comprising:

1. a base member;
2. a front panel attached to said base member and having a cassette insert/eject opening and a plurality of perforations below said opening;
3. a fixed member fixed to said base member and having a sloping plate rising from front to rear side;
4. a supply and a take-up turntables rotatably supported on said sloping plate and separated from each other by a distance equal to that between said hubs of said cassette;
5. a group of manipulation levers including an eject lever, disposed in front of said base member and extended outside said front panel through said perforations of said panel;
6. a door for covering said cassette insert/eject opening;
7. door equipments for always urging said door in the direction of opening;
8. a door lock means for locking said door in the position where said door covers said cassette insert/eject opening, when said door is manually shifted into said position against the urging forces of said door equipments;
9. a door lock releasing means for releasing the locked condition of said door lock means when said eject lever is shifted down;
10. a cassette tray for carrying said cassette thereon with said rear side face facing said group of said manipulation levers, said cassette tray being swingable between the proper operation position in which said turntables are received in said hubs of said cassette and the quasioperation position which is separated from said proper operation position by a certain angle about an axis near said group of said manipulation levers;
11. a pair of stabilizing means for stably locating said cassette tray in said proper operation position and said quasi-operation position, which stabilizing means brings said cassette tray in said quasi-operation position into said proper operation position by rotating said tray by the urging force with which said cassette is pressed against said cassette tray and also brings said cassette tray in said proper operation position into said quasi-operation position in accordance with the actuation of said eject lever; and
12. a cassette lift-up member having a cassette lift-up arm which abuts against said bottom face of said cassette when said cassette tray is kept in said proper operation position by said stabilizing means and can be rotated up from said position about a certain axis near said manipulation levers, which rotates said cassette lift-up arm a little farther then said cassette tray to lift-up said cassette when said cassette tray rotates from said proper operation position to said quasi-operation position, so that said cassette may slide down guided by said arm, and which then stops said cassette sliding down by engaging said arm with said bottom sloping plane of said cassette.

10. A cassette insertion/ejection apparatus as claimed in claim 9, wherein said cassete lift-up arm is pulled forward, said cassette lift-up arm is rotated toward said cassette tray so that said cassette may be drawn out.

11. A cassette insertion/ejection apparatus as claimed in claim 9, further comprising urging members attached to the rear end of said cassette tray, which press the edges of said cassette locating holes of said cassette in said proper operation position against said cassette locating pins inserted in said cassette locating holes toward said manipulation levers so that said cassette may be securely located in its proper operation position, and which press said cassette in its quasi-operation position, with said locating holes separated from said locating pins, toward said manipulation levers so that the pressing force of said urging members may also serve to eject said cassette.

* * * * *